United States Patent [19]

Michiura et al.

[11] Patent Number: 5,407,876
[45] Date of Patent: Apr. 18, 1995

[54] DIELECTRIC CERAMIC COMPOSITION FOR USE IN HIGH FREQUENCY

[75] Inventors: Nobuhiko Michiura; Hiroshi Tamura, both of Otsu, Japan

[73] Assignee: Murata Manufacturing Co., Ltd., Kyoto, Japan

[21] Appl. No.: 245,612

[22] Filed: May 19, 1994

[30] Foreign Application Priority Data

May 21, 1993 [JP] Japan .................. 5-142694

[51] Int. Cl.$^6$ ............................. C04B 35/49
[52] U.S. Cl. ..................................... 501/137
[58] Field of Search .......................... 501/137

[56] References Cited

FOREIGN PATENT DOCUMENTS

| | | | |
|---|---|---|---|
| 0014002 | 8/1980 | European Pat. Off. ........... | 501/137 |
| 0375518 | 6/1990 | European Pat. Off. ...... | C04B 35/49 |
| 533162 | 9/1992 | European Pat. Off. ...... | C04B 35/46 |
| 0253609 | 1/1988 | German Dem. Rep. .... | C04B 35/49 |
| 3615785 | 11/1986 | Germany ..................... | C04B 35/49 |
| 63-292508 | 11/1988 | Japan ........................... | C04B 35/49 |
| 6469514 | 3/1989 | Japan ................................... | 501/137 |

OTHER PUBLICATIONS

Database WPI, Week 8449, Derwent Publications Ltd. London, Great Britain, Japanese Abstract JP-A-59 190 264, Oct. 29, 1984.
Database WPI, Week 9122, Derwent Publications Ltd. London, Great Britain, Japanese Abstract JP-A-3 097 665, Apr. 23, 1993; and Patent Abstract of Japan, vol. 15, No. 282 (C-0850), Apr. 23, 1991.
S. Mhaisalkar, et al. "*Microwave Dielectric Properties of Doped BaTi$_4$O$_9$*", Journal of the American Ceramics Society, vol. 74, No. 8, pp. 1894–1898, 1991.

*Primary Examiner*—David Brunsman
*Attorney, Agent, or Firm*—Ostrolenk, Faber, Gerb & Soffen

[57] ABSTRACT

The present invention is a dielectric ceramic composition capable forming a dielectric resonator device provided with a high Q value at a high frequency band and keep a stable crystal phase when operated at a high power applied field. The dielectric ceramic composition which comprises a base composition expressed by the following chemical formula;

$$BaO-x\{(1-y)TiO_2 \cdot yZrO_2\};$$

wherein $4.300 \leq x \leq 4.450$  $0 < y \leq 0.10$ and
and additives of MnO$_2$ and Ta$_2$O$_5$ in the following weight ratio against the base composition;

$$0 < MnO_2 \leq 0.5 \text{ wt. \%}$$

$$0 < Ta_2O_5 \leq 1.2 \text{ wt. \%}$$

2 Claims, No Drawings

DIELECTRIC CERAMIC COMPOSITION FOR USE IN HIGH FREQUENCY

BACKGROUND OF THE INVENTION

1. Field of the Invention

The present invention relates to a dielectric ceramic composition for use in a high frequency and more particularly to a dielectric ceramic composition which is useful for a material of a dielectric resonator device used at a micro wave band, that is, in a micro wave integrated circuit.

2. Description of Related Art

Recently, mobile communication has spread and a dielectric resonator device is be used as a filter of the base station. Such a dielectric resonator device receives a high power input and so it is necessary to provide a stable dielectric ceramic material resistant to the high power input.

In order to effectively use a limited frequency band, it has been requested to make the frequency band to be more narrow. In response to the requirement, it is desireable to provide a dielectric ceramic material having a high Q value at a high frequency band.

There has been known, for example, a BaO—TiO$_2$ type material as a dielectric resonator device for a micro wave band, which is generally superior in the dielectric characteristic and has a relatively high Q value at a high frequency band such as the micro wave band.

However, such a BaO—TiO$_2$ system material comprises two crystal phases, BaTi$_4$O$_9$ and Ba$_2$Ti$_9$O$_{20}$ having thermal expansion coefficients 9 ppm/°C. and 11 ppm/°C., respectively. When the ceramic made of the BaO—TiO$_2$ system ceramic having both crystal phases included therein is heated, the ceramic generates crack due to a difference of 2 ppm/°C. between both crystal phases in the thermal expansion coefficient. Accordingly, the BaO—TiO$_2$ system ceramic for use at a high power applied field must be composed of a single phase of either BaTi$_4$O$_9$ or Ba$_2$Ti$_9$O$_{20}$.

Further, in relevant literature of the BaO—TiO$_2$ material for use in a high frequency, there is offered a paper entitled "The Ternary Systems BaO—TiO$_2$—SnO$_2$ and BaO—TiO$_2$—ZrO$_2$" J. Am. Ceram. Soc., Vol. 41, No. 10, p.390–394 (1958), in which it is reported that the crystal phase of Ba$_2$Ti$_9$O$_{20}$ can exist stably by substituting Sn or Zr for part of Ti. But, there has no description of the improvement of the dielectric characteristic.

In the Japanese Patent Publication Kokoku sho/56-38007, there is disclosed a Ba—Ti—Mn—Zr system material, in which it is reported that an addition of both Mn and Zr suppresses reduction of a sintered body and prevents the tan δ from increasing, but the resultant ceramic body has only a Q value of 6800 at 6 GHz which is not recognized to be sufficiently high.

In the Japanese Patent Publication Kokai sho/62-165805, there is disclosed a Ba—Ti—Ta—Mn system material, in which it is reported that an addition of both Mn and Ta achieves a high Q value, but no addition of Zr results in a problem that the crystal phase stability of Ba$_2$Ti$_9$O$_{20}$ is not sufficient at the high power applied field.

SUMMARY OF THE INVENTION

The present invention has been developed to overcome the above-described disadvantages.

It is accordingly a first objective of the present invention to provide a dielectric ceramic composition which has a high Q value at the micro wave band when operated at a high power applied field.

A second objective of the present invention is to provide a dielectric ceramic composition which has a stable crystal phase when operated at a high power applied field.

An third objective of the present invention to provide a dielectric resonator device which has a high Q value at the micro wave band and a low thermal expansion coefficient when operated at a high power applied field.

In accomplishing the above and other objectives, according to an aspect of the present invention, there is provided a dielectric ceramic composition for use in high frequency which comprises a base composition and additive MnO$_2$ and Ta$_2$O$_5$, said base composition being represented by the following chemical formula;

$$BaO-x\{(1-y)TiO_2 \cdot yZrO_2\};$$

wherein $4.300 \leq x \leq 4.450$  $0 < y \leq 0.10$ and
said additives being in the following weight ratio against the base composition;

$$0 < MnO_2 \leq 0.5 \text{ wt. \%}$$

$$0 < Ta_2O_5 \leq 1.2 \text{ wt. \%}$$

In the chemical formula of $BaO-x\{(1-y)TiO_2 \cdot yZrO_2\}$, when x is less than 4.300 and more than 4.450, the resultant dielectric resonator device shows a low Q value as shown by the sample No. 17. Accordingly, it is preferable that the x is in a range of $4.300 \leq x \leq 4.450$.

When y is out of the range, $0 < y \leq 0.10$, the resultant dielectric resonator device shows a low relative dielectric constant $\epsilon_r$ at 7 GHz, a low Q value and a high temperature coefficient of resonant frequency $\tau f$ (ppm/°C.) at a positive side as shown in the sample No. 3 in Table 1. Accordingly, it is preferable that the y is within the range of $0 < y \leq 0.10$.

When the additive amount of MnO$_2$ is higher than 0.5 wt. %, the resultant dielectric resonator device is apt to show a low Q value. Accordingly, it is preferable that the additive content of MnO$_2$ is less than 0.5 wt. %.

When the additive amount of Ta$_2$O$_5$ is higher than 1.2 wt. %, the resultant dielectric resonator device is apt to show a low Q value. Accordingly, it is preferable that the additive content of Ta$_2$O$_5$ is less than 1.2 wt. %.

According to the present invention, it is found that the resultant dielectric resonator device prepared by the preferable dielectric composition shows a Q value of more than 7,900 when measured at 7 GHz and $\tau f$ value of less than 10 ppm/°C.

In a preparation of the dielectric ceramic composition for use in high frequency which comprises additives MnO$_2$ and Ta$_2$O$_5$ as well as the base composition, the addition of MnO$_2$ can be achieved not only using manganese oxide, MnO$_2$ but also using other MnO$_2$ precursor, such as MnCO$_3$, which is transformed into MnO$_2$ upon being heated during the sintering process. An additive amount can be calculated on basis of a ratio of MnO$_2$/ MnCO$_3$. As to the addition of Ta$_2$O$_5$, a Ta$_2$O$_5$ precursor may be used instead of Ta$_2$O$_5$ itself. Examples of the precursor include Ta$_2$O$_3$.

The above and other objectives and features of the present invention will become more apparent from the following description of a preferred embodiment thereof.

DETAILED DESCRIPTION OF THE PREFERRED EMBODIMENTS

The following description will be directed to a dielectric ceramic composition for use in a high frequency according to the embodiment of the present invention.

A dielectric ceramic composition of an additive ratio shown in Table 1 is prepared by weighing the starting materials $BaCO_3$, $TiO_2$, $ZrO_2$, $MnO_2$ and $Ta_2O_5$ of a high purity.

TABLE 1

| No | X | Y | $Ta_2O_5$ wt. % | $MnO_2$ wt. % | $\epsilon_r$ | Q (7 GHz) | $\tau f$ ppm/°C. |
|---|---|---|---|---|---|---|---|
| 1 | 4.330 | 0.015 | 0.670 | 0.100 | 38.0 | 8200 | 6.8 |
| 2 | 4.330 | 0.028 | 0.670 | 0.100 | 37.8 | 8100 | 7.1 |
| 3* | 4.330 | 0.126 | 0.670 | 0.100 | 35.6 | 5900 | 19.0 |
| 4 | 4.348 | 0.018 | 0.670 | 0.100 | 38.5 | 8400 | 6.0 |
| 5 | 4.348 | 0.037 | 0.670 | 0.100 | 38.1 | 8200 | 6.2 |
| 6 | 4.348 | 0.055 | 0.670 | 0.100 | 37.3 | 8000 | 8.7 |
| 7* | 4.405 | 0 | 0.670 | 0.100 | 39.1 | 4000 | 3.9 |
| 8 | 4.405 | 0.018 | 0.670 | 0.100 | 38.6 | 8200 | 4.6 |
| 9 | 4.405 | 0.037 | 0.670 | 0.100 | 38.3 | 8100 | 4.5 |
| 10 | 4.405 | 0.055 | 0.670 | 0.100 | 37.8 | 7800 | 6.7 |
| 11 | 4.425 | 0.018 | 0.670 | 0.100 | 38.7 | 8300 | 4.4 |
| 12 | 4.425 | 0.037 | 0.670 | 0.100 | 38.2 | 8100 | 3.9 |
| 13 | 4.425 | 0.055 | 0.670 | 0.100 | 37.8 | 8000 | 6.5 |
| 14 | 4.450 | 0.018 | 0.670 | 0.100 | 38.6 | 8000 | 3.4 |
| 15 | 4.450 | 0.037 | 0.670 | 0.100 | 38.4 | 7900 | 6.2 |
| 16 | 4.450 | 0.055 | 0.670 | 0.100 | 37.9 | 7900 | 4.7 |
| 17* | 4.464 | 0.018 | 0.670 | 0.100 | 38.4 | 1400 | — |
| 18* | 4.464 | 0.055 | 0.670 | 0.100 | 38.0 | 7500 | 4.6 |
| 19* | 4.425 | 0.018 | 0 | 0 | 38.2 | 7400 | 3.5 |
| 20* | 4.425 | 0.018 | 0 | 0.05 | 38.2 | 6900 | 3.8 |
| 21* | 4.425 | 0.018 | 0 | 0.10 | 38.4 | 6700 | 5.1 |

In the Table 1, the sample number marked with * indicates the dielectric ceramic composition out of the scope of the present invention and is prepared for comparison. Other sample number indicates the composition within the scope of the present invention.

The starting materials are put in a ball mill with water and mixed for 16 hours in a wet method into a mixture. The mixture is calcined at 1,000° C. to 1,200° C. for 3 hours.

The semi-calcined mixture is put in a ball mill with water and an organic binder and crushed for 16 hours in a wet method and is dried in air. The dried mixture is granulated through a 50 mesh to obtain a powder mixture for use in a dielectric ceramic composition.

The powder mixture is pressed into a disc of a diameter of 12 mm and thickness of 5.5 mm with a pressure of 2.500 kg/cm². The pressed disc is sintered at 1,200° C. to 1,400° C. for 4 hours to form a dielectric ceramic body.

The dielectric ceramic body is measured with a relative dielectric constant $\epsilon_r$ at 7 GHz, Q value and temperature coefficient of resonant frequency $\tau f$ (ppm/°C.) according to the dielectric rod resonators method as disclosed by Y. Kobayashi and M. Katoh in "Microwave Measurement of Dielectric properties of lo-loss Materials by the Dielectric Resonator Method", IEEE Trans. on MTT, MTT-33, 586–592 (1985).

The Table 1 shows the test result of a relative dielectric constant $\epsilon_r$ at 7 GHz, Q value and temperature coefficient of resonant frequency $\tau f$ (ppm/°C.).

As shown in Table 1, a low Q value is obtained with sample No. 3, 7, 17, and 18 which are out of the scope of the present invention in connection with the x ($TiO_2$) and y ($ZrO_2$), sample No. 19 having no additive $MnO_2$ and $Ta_2O_5$, and sample No. 20 and 21 having no additive $Ta_2O_5$.

On the other hand, the dielectric ceramic compositions according to the present invention show a high relative dielectric constant $\epsilon_r$ at 7 GHz, a high Q value and a low temperature coefficient of resonant frequency $\tau f$ (ppm/°C.) less than 10 ppm/°C.

As to the stability of the crystal phase, the following tests are carried out:

1) Sample No. 7 with no addition of Zr is subjected to a boiling test in water, which results in cracking of the sintered body due to the difference of thermal expansion coefficients of $BaTi_4O_9$ and $Ba_2Ti_9O_{20}$.
2) Samples within the scope of the invention do not show the cracking because of the single phase $Ba_2Ti_9O_{20}$ due to Zr addition.

Although the present invention has been fully described by way of examples it is to be noted here that various changes and modifications will be apparent to those skilled in the art. Therefore, unless such changes and modifications otherwise depart from the spirit and scope of the present invention, they should be construed as being included therein.

What is claimed is:

1. A dielectric ceramic composition for use in high frequency which comprises:
  1) a base composition represented by the following formula;

$$BaO\text{-}x\{(1-y)TiO_2\cdot yZrO_2\};$$

wherein $4.300 \leq x \leq 4.450$  $0 < y \leq 0.10$
and 2) additives of $MnO_2$ and $Ta_2O_5$ in the following weight ratio against the base composition;

$$0 < MnO_2 \leq 0.5 \text{ wt. \%}$$

$$0 < Ta_2O_5 \leq 1.2 \text{ wt. \%}.$$

2. A dielectric resonator device, which is made of a dielectric ceramic composition for use in high frequency which comprises: 1) a base composition represented by the following formula;

$$BaO\text{-}x\{(1-y)TiO_2\cdot yZrO_2\};$$

wherein $4.300 \leq x \leq 4.450$  $0 < y \leq 0.10$
and 2) additives of $MnO_2$ and $Ta_2O_5$ in the following weight ratio against the base composition;

$$0 < MnO_2 \leq 0.5 \text{ wt. \%}$$

$$0 < Ta_2O_5 \leq 1.2 \text{ wt. \%}$$

and which is provided with Q value of more than 7,900 when measured at 7 GHz and $\tau f$ value of less than 10 ppm/°C.

* * * * *